US011298764B2

(12) United States Patent
Liu et al.

(10) Patent No.: US 11,298,764 B2
(45) Date of Patent: Apr. 12, 2022

(54) CIRCULAR SAW THAT USES A PRISM TO REFLECT THE CUT IMAGES (71) Applicant: DURQ MACHINERY CORP., Taichung (TW)

(72) Inventors: Chia-Sheng Liu, Taichung (TW); Yi-Li Cheng, Taichung (TW); Wen-Hung Lo, Taichung (TW)

(73) Assignee: DURQ MACHINERY CORP., Taichung (TW)

( * ) Notice: Subject to any disclaimer, the term of this patent is extended or adjusted under 35 U.S.C. 154(b) by 0 days.

(21) Appl. No.: 16/915,222

(22) Filed: Jun. 29, 2020

(65) Prior Publication Data
US 2021/0379680 A1 Dec. 9, 2021

(30) Foreign Application Priority Data
Jun. 5, 2020 (TW) ................................ 109118982

(51) Int. Cl.
*B23D 45/16* (2006.01)
*B23D 59/00* (2006.01)
*G02B 17/04* (2006.01)
*B27G 19/04* (2006.01)

(52) U.S. Cl.
CPC ........... *B23D 59/003* (2013.01); *B23D 45/16* (2013.01); *B27G 19/04* (2013.01); *G02B 17/04* (2013.01)

(58) Field of Classification Search
CPC ...... B23D 45/16; B23D 59/003; B23D 59/00; G02B 17/04; B27G 19/04
USPC .......................................................... 30/390
See application file for complete search history.

(56) References Cited

U.S. PATENT DOCUMENTS

| | | | | |
|---|---|---|---|---|
| 1,952,073 A | * | 3/1934 | Jones ..................... | B26D 7/015 83/459 |
| 3,504,716 A | * | 4/1970 | Bush .................... | B23D 59/002 30/123 |
| 3,656,391 A | * | 4/1972 | Von Arx ............ | G02B 21/0016 83/521 |
| 5,794,351 A | * | 8/1998 | Campbell ............ | B23D 59/002 30/390 |
| 5,795,113 A | * | 8/1998 | Wixey ................... | B23Q 17/24 144/116 |
| 5,999,237 A | * | 12/1999 | Miyawaki .............. | G02B 17/02 349/42 |
| 6,543,143 B2 | | 4/2003 | Moore et al. | |
| 6,742,430 B2 | * | 6/2004 | Chen .................... | B23D 59/003 83/471.3 |

(Continued)

*Primary Examiner* — Nhat Chieu Q Do
(74) *Attorney, Agent, or Firm* — Muncy, Geissler, Olds & Lowe, P.C.

(57) ABSTRACT

A circular saw includes a housing, a sawing assembly including a motor and a saw blade located at two opposite sides of the housing and connected together so that the saw blasé can be driven by the motor to saw the workpiece and a saw blade shield secured to the housing and covering a part of the saw blade to prevent the saw blade from cutting the surrounding people, and a prism assembly including a protective cover affixed to the front end of the saw blade shield and a prism located in the protective cover to reflect the image of the saw blade sawing the workpiece through a window of the protective cover to the line of sight of the operator. In this way, the operator can clearly confirm whether the sawing path is skewed with the normal operating posture to improve the efficiency.

8 Claims, 12 Drawing Sheets (56) References Cited

U.S. PATENT DOCUMENTS

| | | | |
|---|---|---|---|
| 6,744,573 B2 * | 6/2004 | Atsumi | G02B 7/1805 |
| | | | 359/631 |
| 7,219,434 B2 | 5/2007 | Moore et al. | |
| 2007/0193039 A1 * | 8/2007 | Onose | B27B 9/00 |
| | | | 30/388 |

* cited by examiner

CIRCULAR SAW THAT USES A PRISM TO REFLECT THE CUT IMAGES

BACKGROUND OF THE INVENTION

1. Field of the Invention

The present invention relates to sawing machines and more particularly, to a circular saw that uses a prism to reflect the cut images.

2. Description of the Related Art

The conventional circular saw usually opens at least one window on the side of the protective cover, allowing the operator to confirm whether the sawing path is skewed through this window. However, the aforementioned windows are mostly located on the left and right sides of the saw blade. Related patent documents are seen in U.S. Pat. Nos. 7,219,434 or 6,543,143, etc. However, the aforementioned arrangement causes the operator to use a roll or forward posture to view the movement through these windows. However, such an operation posture is not only difficult to align with the cutting line, in addition, the side will have a slight error in the alignment of the viewing angle, but also may cause an unstable center of gravity and safety concerns during the operation. In addition, most circular saws use a transparent material (such as PC) for the front cover so that the operator can observe the sawing state through the transparent front cover. However, after several operations, the high-temperature iron scraps from the saw will still cause the transparent front cover to blur and not be seen clear.

SUMMARY OF THE INVENTION

The present invention has been accomplished under the circumstances in view. It is the main object of the present invention to provide a circular saw, which is convenient for the operator to observe the cutting state, in order to improve the operation efficiency and convenience, and ensure the safety of use.

To achieve this and other objects of the present invention, a circular saw comprises a housing, a sawing assembly, and a prism assembly. The sawing assembly comprises a motor, a saw blade and a saw blade shield. The motor is located on one side of the housing. The saw blade is located on an opposite side of the housing and connected to the motor so that the saw blade can be driven by the motor to saw the workpiece. The saw blade shield is secured to the housing and covers a part of the saw blade. The prism assembly is located in front of the saw blade, comprising a protective cover and at least one prism. The protective cover is affixed to a front end of the saw blade shield, comprising a window located on a top surface thereof and an opening located on a bottom surface thereof. The at least one prism is located in the protective cover. Each prism comprises an incident surface, a reflective surface located in front of the incident surface, and an exit surface located above the reflective surface. The incident surface receives an image of the saw blade sawing the workpiece through the opening of the protective cover. The reflective surface reflects the image received by the incident surface to the exit surface. The exit surface emits the image reflected from the reflective surface through the window of the protective cover.

It can be seen from the above that the circular saw of the present invention allows the image of the saw blade sawing the workpiece to fall within the line of sight of the operator through the configuration of the at least one prism after reflection.

In this way, the operator can confirm whether the sawing path of the saw blade is skewed through the sawing image presented by the window from the front of the operation, and does not need to tilt or lean forward to improve the efficiency and convenience of the operation, ensuring the safety of use.

Preferably, the protective cover has a top thereof provided with an infrared generator in front of the window. The infrared generator is used to emit an infrared beam to the surface of the workpiece. The sawing path formed by the infrared beam helps the saw blade to be aligned and positioned.

Preferably, the prism assembly further comprises a transparent protective plate provided at the opening of the protective cover to face the incident surface. The transparent protective plate protects the prism from being damaged by the cutting chips ejected by the workpiece during sawing.

Preferably, the protective cover comprises a long slot. The prism assembly further comprises a mobile plate and a scraper. The mobile plate is movably mounted in the long slot, comprising a hollow groove for allowing the transparent protective plate to expose to the outside. The mobile plate has one end thereof protruding out of the protective cover and forming an operating portion. The scraper is affixed to an opposite end of the mobile plate and abutted at the transparent protective plate. By repeatedly pushing and pulling the mobile plate, the scraper can scrape the impurities attached to the surface of the transparent protective plate.

Preferably, a light source is provided on one side of the housing, so that the light inside the protective cover is uniform and bright, and the light source makes the image received by the prism clearer, which is beneficial to the sawing process.

Preferably, the number of the at least one prism can two and configured in an up-and-down manner. The lower prism is defined as lower prism, and the upper prism is defined as upper prism. The incident surface of the lower prism receives the image of the saw blade sawing the workpiece through the opening of the protective cover. The reflective surface of the lower prism reflects the image received by the incident surface of the lower prism to the exit surface of the lower prism. The exit surface of the lower prism emits the image reflected by the reflective surface of the lower prism to the incident surface of the upper prism. The incident surface of the upper prism receives the image from the exit surface of the lower prism. The reflective surface of the upper prism reflects the image received by the incident surface of the upper prism to the exit surface of the upper prism. The exit surface of the upper prism emits the image reflected from the reflective surface of the upper prism through the window of the protective cover. The sawing image emitted after the secondary reflection will be displayed as a positive image, which is convenient for the operator to watch.

Preferably, the incident surface, the reflective surface and the exit surface can be all flat or curved, or a part flat and a part curved. The three can be arbitrarily adjusted and changed according to actual needs.

The detailed structure, characteristics, assembly or use of the circular saw provided by the present invention will be described in the detailed description of the subsequent embodiments. However, those with ordinary knowledge in the field of the present invention should be able to understand that these detailed descriptions and specific embodiments listed in the implementation of the present invention are only used to illustrate the present invention, not to limit the scope of the patent application of the present invention.

DETAILED DESCRIPTION OF THE INVENTION

The applicant first states here that in the entire specification, including the preferred embodiments described below and the claims in the scope of patent application, the terms related to directionality are based on the directions in the drawings. Secondly, in the preferred embodiments and drawings to be described below, the same element numbers represent the same or similar elements or their structural features.

Figure 1:
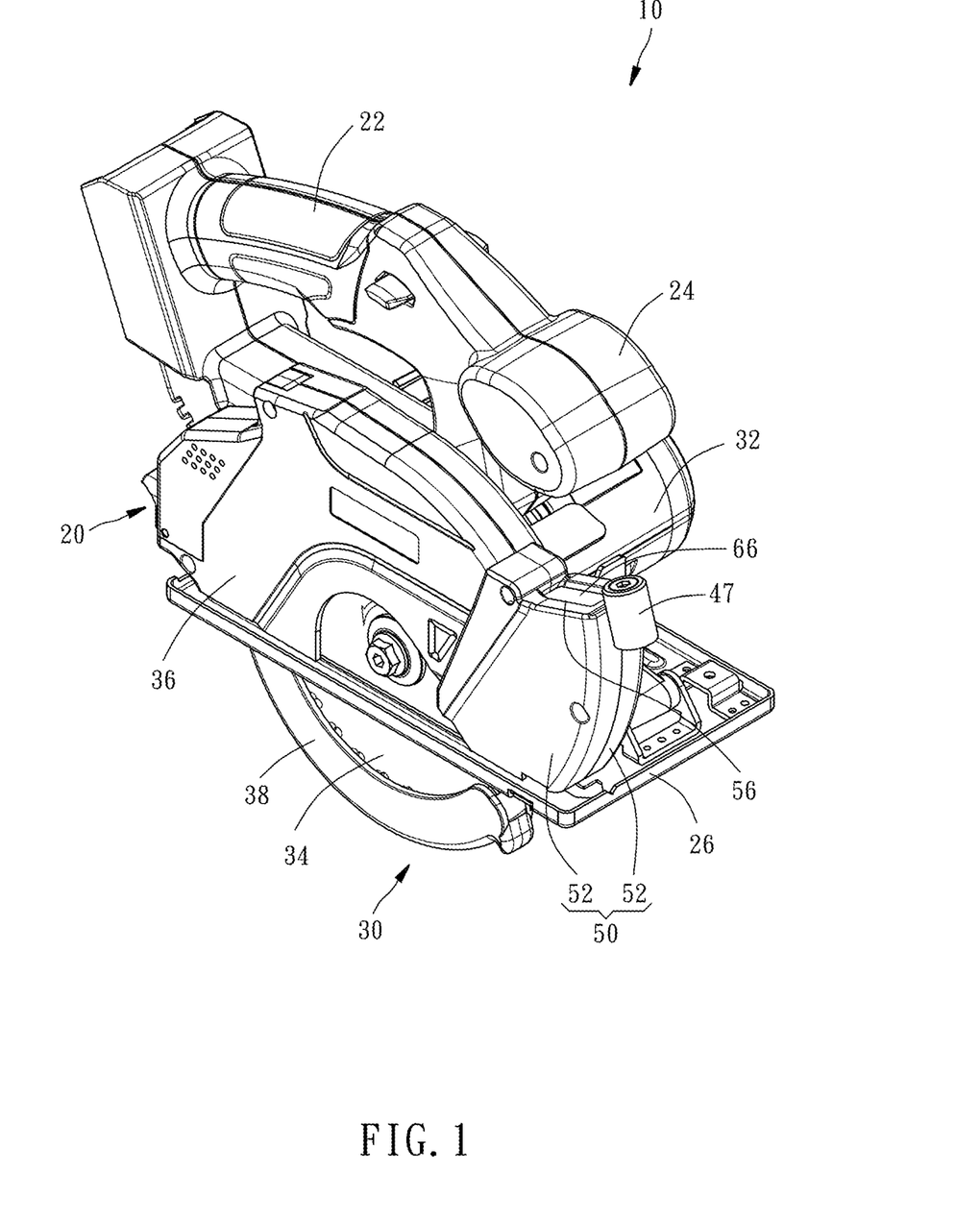
FIG. 1 is an oblique top elevational view of a circular saw in accordance with a first embodiment of the present invention.
Figure 2:
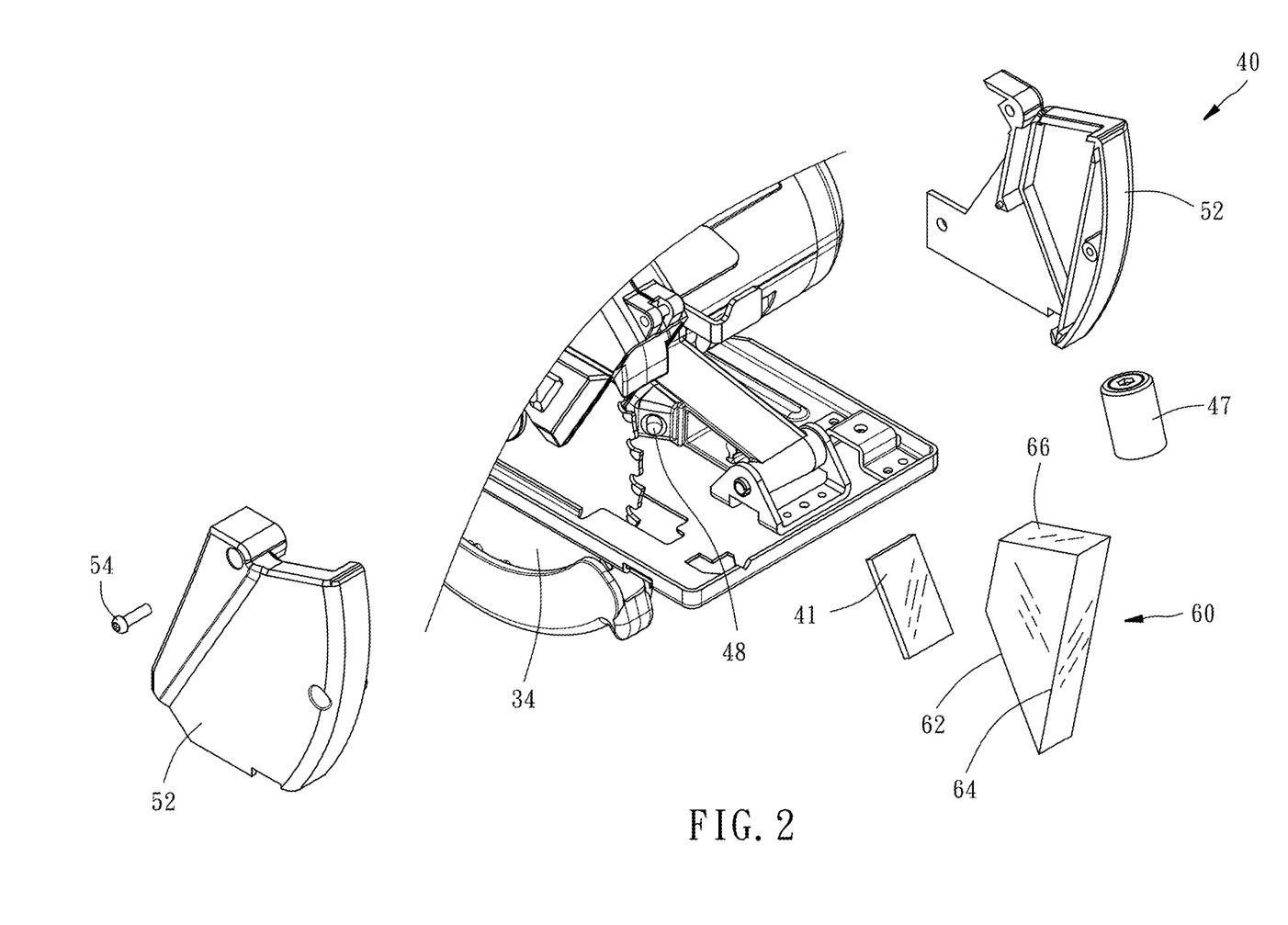
FIG. 2 is an exploded view of a part of the circular saw in accordance with a first embodiment of the present invention.

Referring to FIGS. 1 and 2, the circular saw 10 of the first preferred embodiment of the present invention takes a handheld circular saw as an example, which comprises a housing 20, a sawing assembly 30, and a prism assembly 40.

Figure 3:
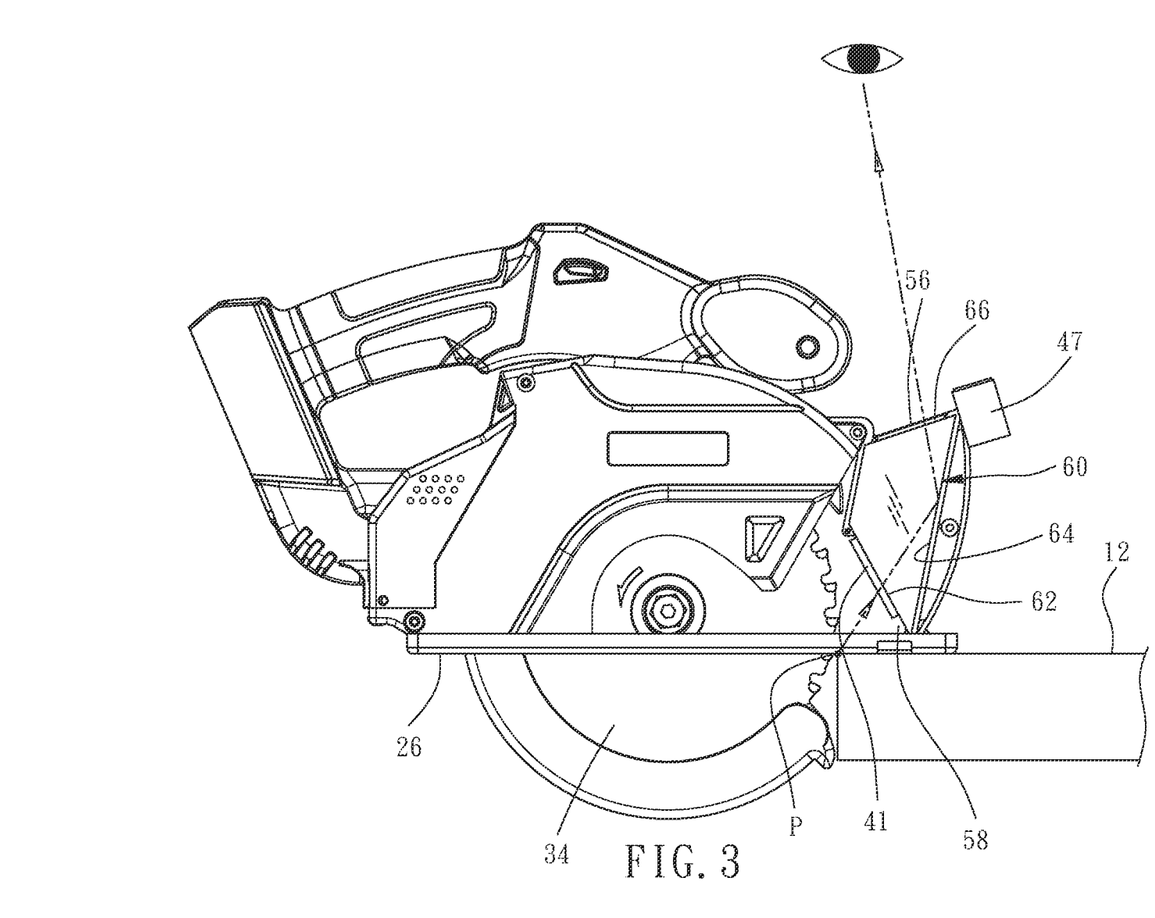
FIG. 3 is a side view of the circular saw of the first embodiment of the present invention, omitting a part of the protective cover.

The housing 20 comprises a main grip 22 located on a top surface thereof, an auxiliary grip 24 located on the top surface in front of the main grip 22, and a bottom plate 26 located on an opposing bottom surface thereof for abutting the top surface of the workpiece 12 (as shown in FIG. 3).

The sawing assembly 30 comprises a motor 32 and a saw blade 34. The motor 3 is located on a left side of the housing 20. The saw blade 34 is located on an opposing right side of the housing 20 and is connected to the motor 32, so that the saw blade 34 can be driven by the motor 32 to saw the workpiece 12 (see FIG. 3). The sawing assembly 30 further comprises a saw blade shield 36 and a mobile shield 38. The saw blade shield 36 is secured to the right side of the housing 20 with screws and covers the upper half of the saw blade 34, to prevent the saw blade 34 or workpiece cutting chips from injuring people around. The mobile shield 38 is pivotally connected to the housing 20 below the bottom plate 26. When sawing is required, first open the mobile shield 38 to expose the lower half of the saw blade 34. After the sawing process is completed, the mobile shield 38 is closed, so that the lower half of the saw blade 34 is covered by the mobile shield 38 to prevent the saw blade 34 from cutting the surrounding people.

As shown in FIG. 2, the prism assembly 40 comprises a protective cover 50 made of a transparent material (such as polycarbonate, PC). The protective cover 50 is composed of left and right cover plates 52, and the left and right cover plates 52 are located above the bottom plate 26 and a screw 54 is used to lock the protective cover 50 to a front end of the saw blade shield 36 so that the protective cover 50 is located in front of the saw blade 34.

As shown in FIGS. 1 and 3, the protective cover 50 has a window 56 located on a top surface thereof, and an opening 58 located on an opposing bottom surface thereof. In addition, in the present preferred embodiment, the prism assembly 40 comprises a prism 60 (here trapezoidal prism). As shown in FIGS. 2 and 3, the prism 60 is installed in the protective cover 50 and has an incident surface 62, a reflective surface 64 located in front of the incident surface 62, and an exit surface 66 located above the reflective surface 64, wherein the incident surface 62 receives the image of the saw blade 34 sawing the workpiece 12 via the opening 58, the reflective surface 64 reflects the image received by the incident surface 62 to the exit surface 66, and the exit surface 66 emits the image reflected from the reflective surface 64 via the window 56. As shown in FIG. 3, the image shows a point P at which the saw blade 34 cuts a workpiece 12. Further, the reflective surface 64 of the prism 60 is located in front of the point P.

Figure 4:
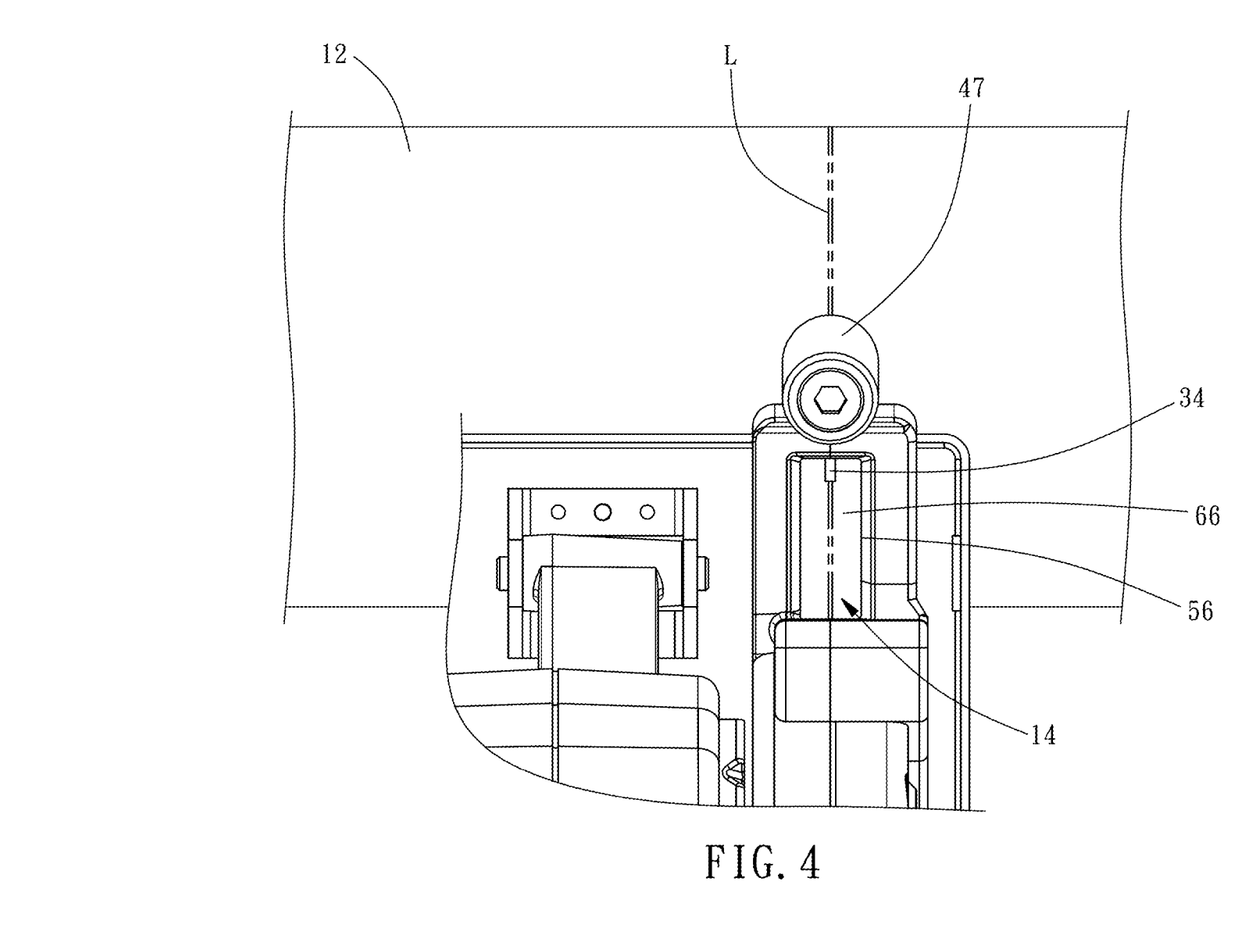
FIG. 4 is a top view of a part of the circular saw in accordance with the first embodiment of the present invention, mainly showing that the sawing image presented from the window is an inverted image.

Before starting sawing, you can manually draw a sawing path on the surface of the workpiece 12 or set an infrared generator 47 at the top of the protective cover 50 in front of the window 56, as shown in FIGS. 3 and 4. The infrared beam emitted by the infrared generator 47 forms a sawing path L on the surface of the workpiece 12, and then the saw blade 34 can be started to saw the workpiece 12 along the aforementioned sawing path L. During the sawing process, the sawing image 14 of the saw blade 34 will exit the exit surface 66 in a reverse image after a reflection from the prism 60. At this time, the operator can confirm whether the sawing path L of the saw blade 34 is skewed through the sawing image 14 emitted from the window 56 in the normal operating posture. In addition, as shown in FIG. 2, a light source 48 such as an LED can be provided on the right side of the housing 20. With the light source 48, the image received by the incident surface 62 of the prism 60 is clearer, and the light inside the protective cover is even and bright, which is beneficial to sawing.

Figure 5:
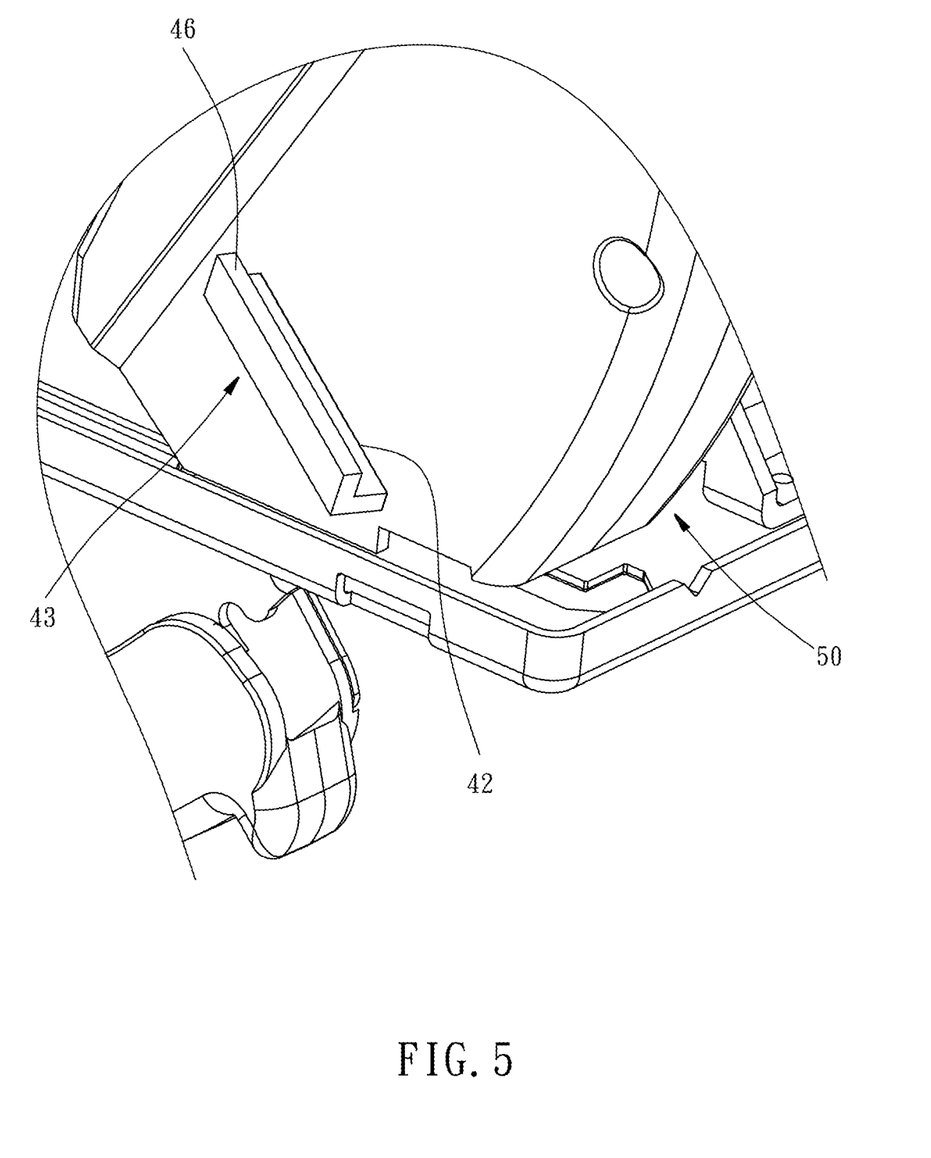
FIG. 5 is an elevational view of a part of a circuit saw in accordance with a second embodiment of the present invention.
Figure 6:
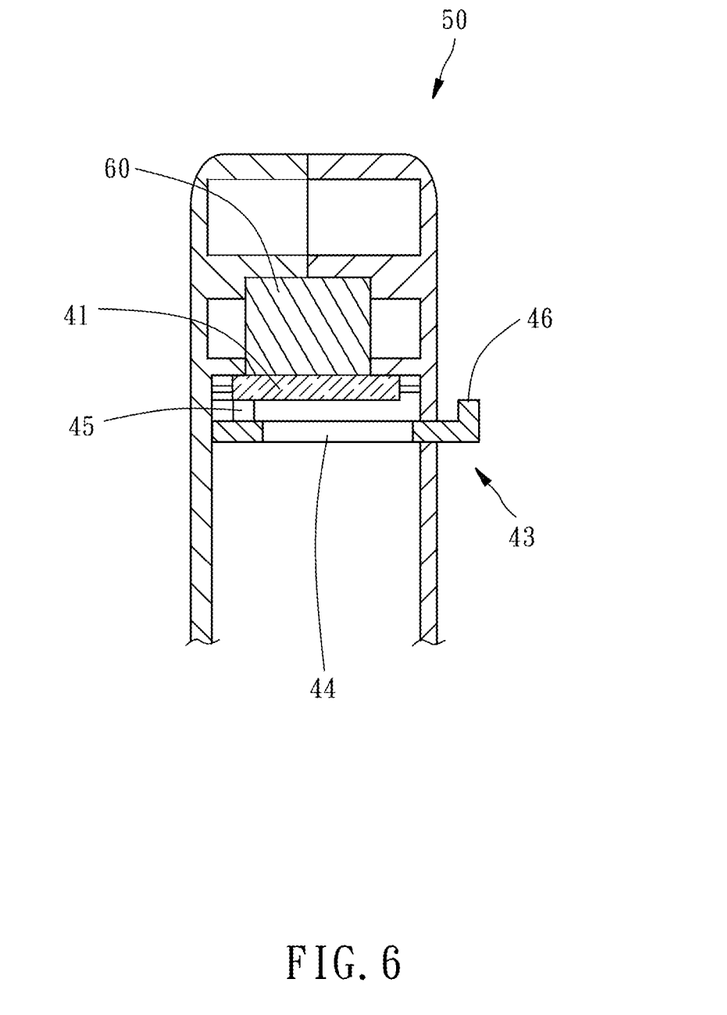
FIG. 6 is a sectional view of a part of the circuit saw in accordance with a second embodiment of the present invention.
Figure 7:
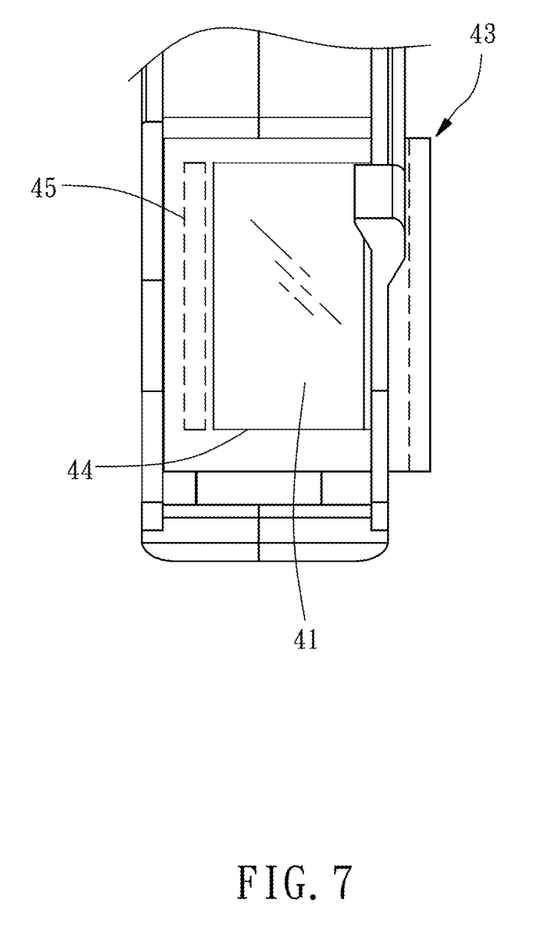
FIG. 7 is a bottom view of FIG. 6.

As shown in FIGS. 2 and 3, in order to prevent the incident surface 62 of the prism 60 from being damaged by the impact of the ejected cutting chips, a transparent protective plate 41 (such as transparent glass plate) facing the incident surface 62 can be provided at the opening 58 of the protective cover 50. Thus, it provides a protective effect on the prism 60 with the transparent protective plate 41. However, after a period of use, the surface of the transparent protective plate 41 is easily attached to impurities (such as dust or cutting chips). In order to avoid being too dirty and affecting the next operation, as shown in FIGS. 5 to 7, a long slot 42 is provided in the protective cover 50 and a mobile plate 43 that can move laterally is provided in the long slot 42. The mobile plate 43 has a hollow groove 44 to expose a part of the transparent protective plate 41. One end of the mobile plate 43 is fixed with a scraper 45 made of rubber or other soft materials, and the other end of the mobile plate 43 protrudes out of the protective cover 50 and forms an operating portion 46. In this way, when the operating portion 46 of the mobile plate 43 is pushed and pulled repeatedly, the mobile plate 43 will move back and forth relative to the transparent protective plate 41 together with the scraper 45, so that the scraper 45 can be used to scrape off the impurities attached to the surface of the transparent protective plate 41.

Figure 8A:
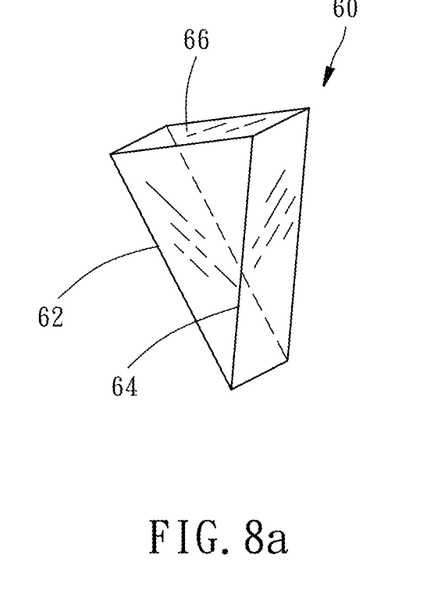
FIG. 8a is a perspective view of a triangular prism provided by the circular saw of the present invention.
Figure 8B:
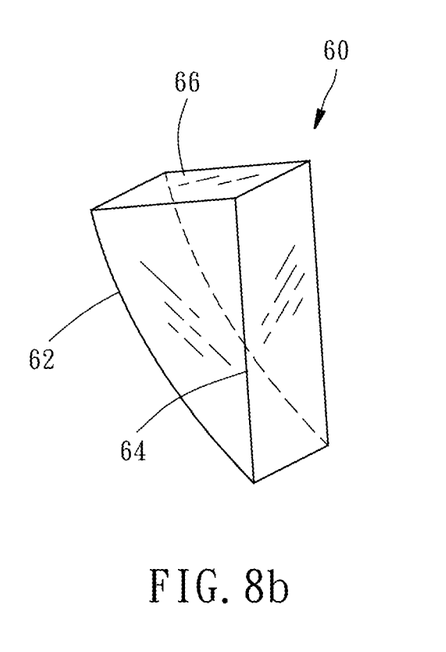
FIG. 8b is a perspective view of an alternate form of the triangular prism provided by the circular saw of the present invention.
Figure 9:
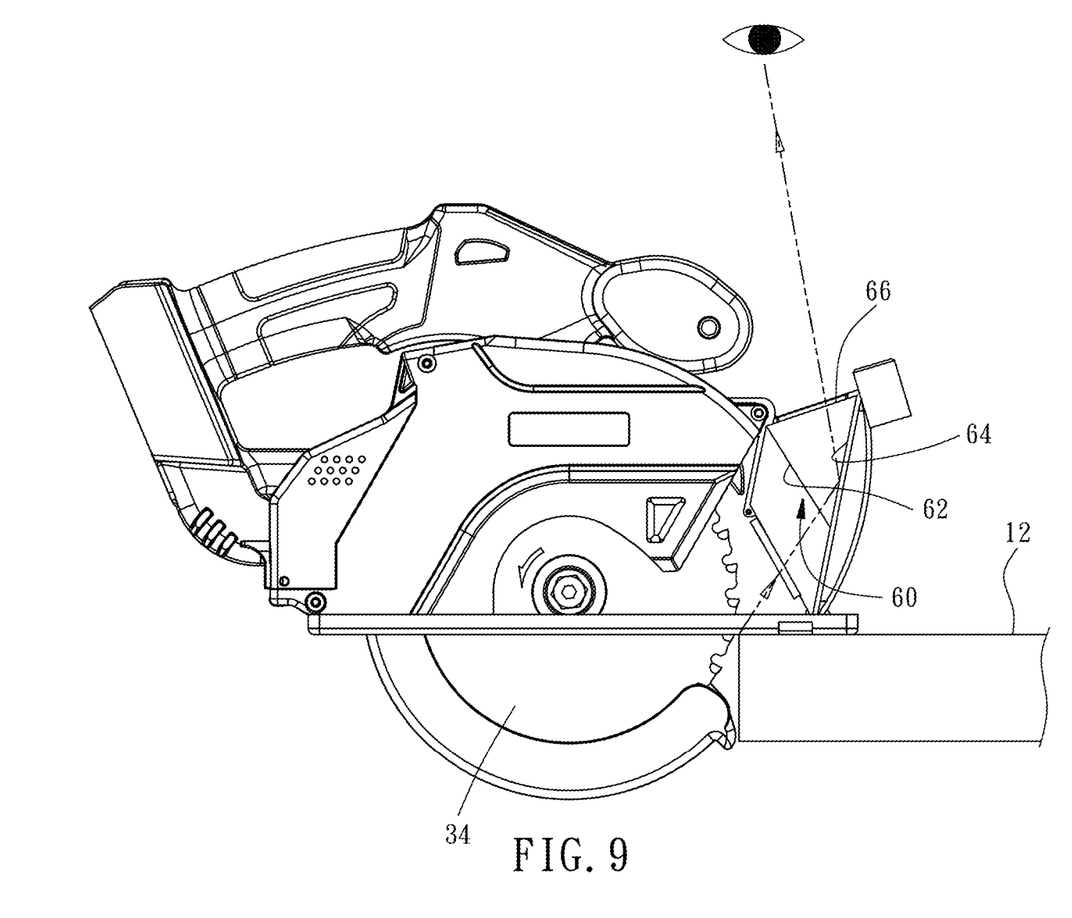
FIG. 9 is similar to FIG. 3, mainly showing the use of a triangular prism.
Figure 10:
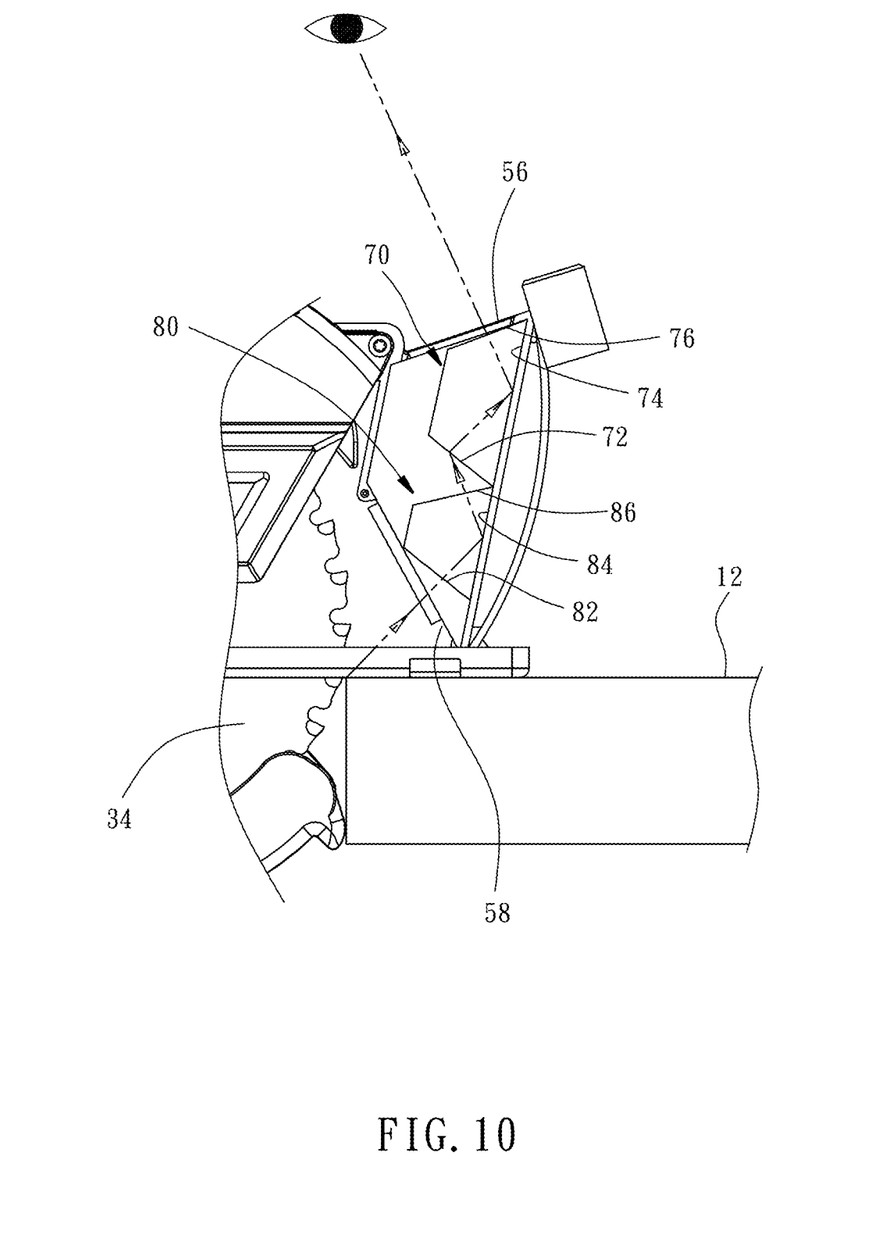
FIG. 10 is similar to FIG. 3, mainly showing the use of two trapezoidal prisms.
Figure 11:
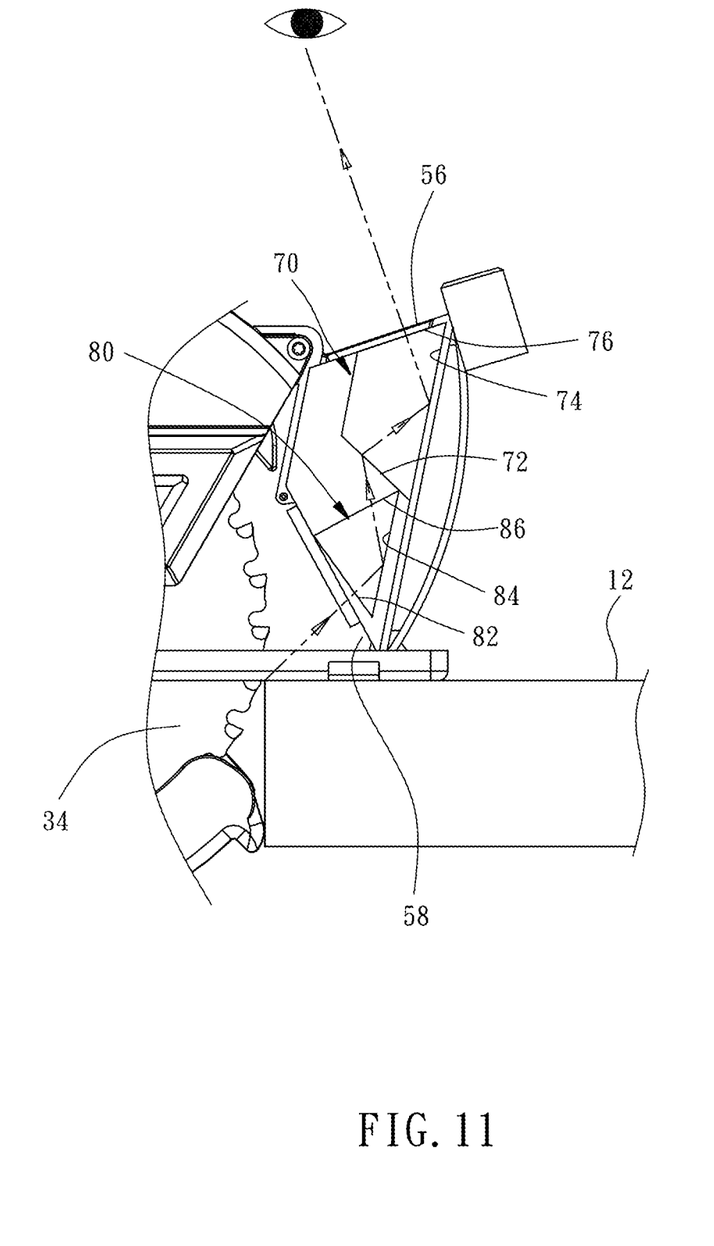
FIG. 11 is similar to FIG. 10, mainly showing the use of one trapezoidal prism and one triangular prism.
Figure 12:
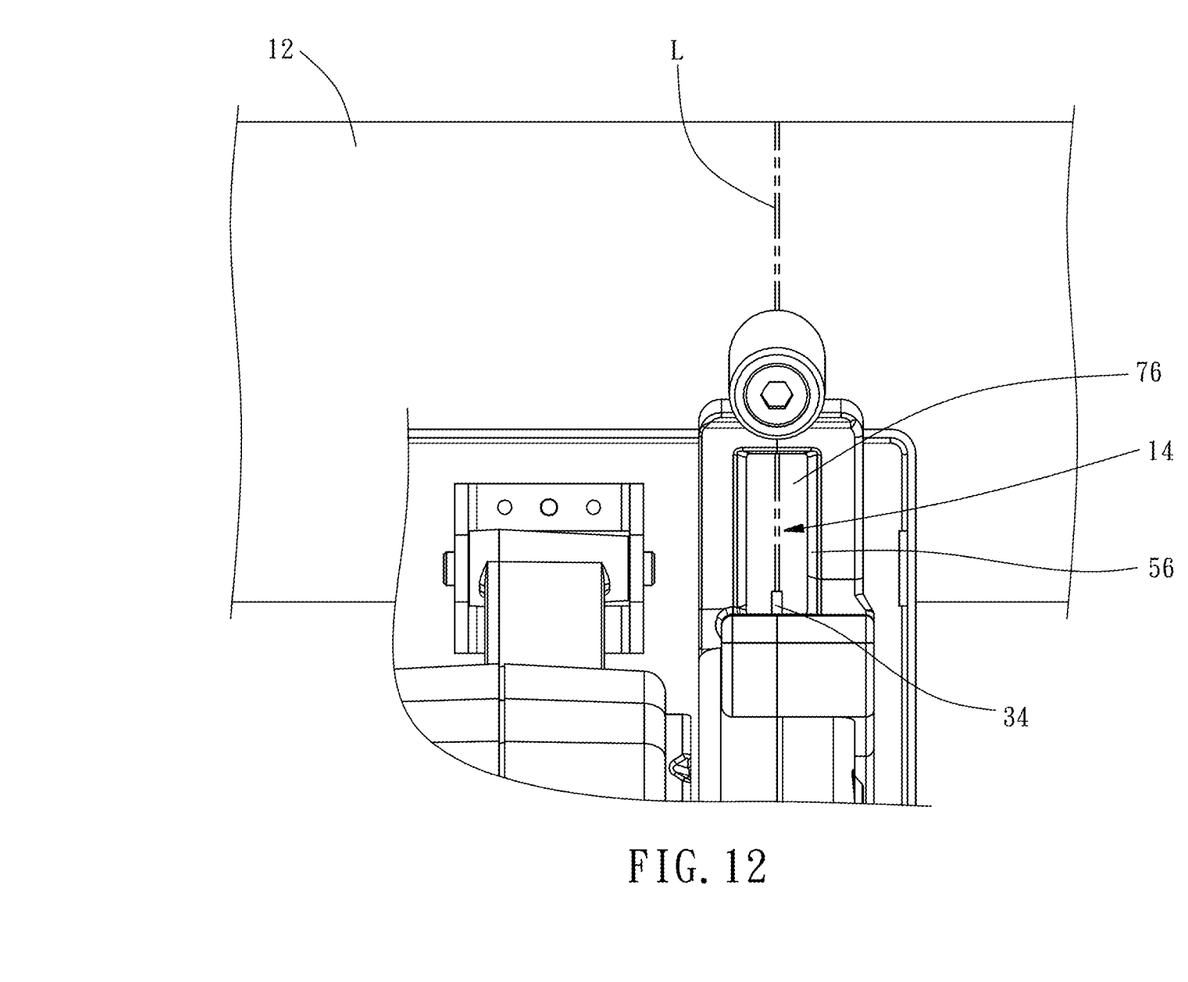
FIG. 12 is similar to FIG. 8, mainly showing that the sawing image presented from the window is a positive image.

What needs to be added here is that the aforementioned prism 60 uses trapezoidal prism, in fact, it can also be replaced by triangular prism. As shown in FIGS. 8a, 8b and 9, the three faces of the triangular prism are exactly the incident surface 62, the reflective surface 64 and the exit surface 66. The incident surface 62, the reflective surface 64 and the exit surface 66 can all be flat or curved, or they can be partly flat and partly curved (as shown in FIG. 8b). The three can be adjusted and changed according to actual needs. On the other hand, the number of prism can also be increased to two and configured in a one-on-one manner. In terms of type, it can also be arbitrarily matched according to actual needs. For example, the upper and lower prisms 70 and 80 can be both trapezoidal prisms (as shown in FIG. 10), or the upper prism 70 is a trapezoidal prism, and the lower prism 80 is a triangular prism (as shown in FIG. 11). However, regardless of the above configuration, the incident surface 82 of the lower prism 80 receives the image of the saw blade 34 sawing the workpiece 12 via the opening 58 of the protective cover 50. The reflective surface 84 of the lower prism 80 reflects the image received by the incident surface 82 of the lower prism 80 to the exit surface 86 of the lower prism 80. The exit surface 86 of the lower prism 80 emits the image reflected by the reflective surface 84 of the lower prism 80 to the incident surface 72 of the upper prism 70. The incident surface 72 of the upper prism 70 receives the image from the exit surface 86 of the lower prism 80. The reflective surface 74 of the upper prism 70 reflects the image received by the incident surface 72 of the upper prism 70 to the exit surface 76 of the upper prism 70. The exit surface 76 of the upper prism 70 emits the image reflected from the reflective surface 74 of the upper prism 70 through the window 56 of the protective cover 50. In other words, when two prisms 70 and 80 are provided, the sawing image 14 of the saw blade 34 will undergo secondary reflection. At this time, the sawing image 14 presented through the window 56 is presented in a positive way (as shown in FIG. 12), so that the operator can more easily confirm whether the sawing path L of the saw blade 34 is skewed through the sawing image 14 presented on the window 56. In summary, the circular saw 10 of the present invention allows the image of the saw blade 34 sawing the workpiece 12 to fall within the line of sight of the operator through the configuration of one prism 60 or two prisms 70, 80 after one or two reflections, and regardless of whether the sawing image 14 presented in the window 45 is a positive or negative image, the left and right sides of the sawing image 14 look the same from the front of the operation. In this way, the operator can confirm whether the sawing path L of the saw blade 34 is skewed through the sawing image 14 presented by the window 56 from the front of the operation, and does not need to tilt or lean forward to improve the efficiency and convenience of the operation, ensuring the safety of use.

What is claimed is:

1. A circular saw for sawing a workpiece, said circular saw comprising:
   a housing;
   a sawing assembly comprising a motor, a saw blade and a saw blade shield, said motor being located on one side of said housing, said saw blade being located on an opposite side of said housing and connected to said motor so that said saw blade is drivable by said motor to saw said workpiece, said saw blade shield being secured to said housing and covering a part of said saw blade; and
   a prism assembly located in front of said saw blade, said prism assembly comprising a protective cover, a transparent protective plate, a scraper for scraping off impurities attach to a surface of the transparent protective plate, and at least one prism, said protective cover being affixed to a front end of said saw blade shield, said protective cover comprising a window located on a top surface thereof and an opening located on a bottom surface thereof, said at least one prism being located in said protective cover, each said prism comprising an incident surface, a reflective surface located in front of said incident surface, and an exit surface located above said reflective surface, said incident surface receiving an image of said saw blade sawing said workpiece through said opening of said protective cover, said reflective surface reflecting the image received by said incident surface to said exit surface, said exit surface emitting the image reflected from said reflective surface through said window of said protective cover;
   wherein the image shows a point at which the said saw blade cuts a workpiece, and said reflective surface of said prism is located in front of said point.

2. The circular saw as claimed in claim 1, wherein said protective cover has a top thereof provided with an infrared generator in front of said window, said infrared generator being adapted to emit an infrared beam to a surface of said workpiece.

3. The circular saw as claimed in claim 1, wherein the transparent protective plate is provided at said opening of said protective cover to face said incident surface of the at least one prism.

4. The circular saw as claimed in claim 3, wherein said protective cover comprises a long slot; said prism assembly further comprises a mobile plate, said mobile plate being movably mounted in said long slot and comprising a hollow groove for allowing said transparent protective plate to expose to outside, said mobile plate having one end thereof protruding out of said protective cover and forming an operating portion, said scraper being affixed to an opposite end of said mobile plate and abutted at said transparent protective plate.

5. The circular saw as claimed in claim 1, wherein said housing has one side thereof provided with a light source, said light source being used to emit light at a contact position of said saw blade and said workpiece.

6. The circular saw as claimed in claim 1, wherein the at least one prism of said prism assembly comprises two prisms, which are a lower prism and an upper prism located above said lower prism, the incident surface of said lower prism receiving the image of said saw blade sawing said workpiece through said opening of said protective cover, the reflective surface of said lower prism reflecting the image received by the incident surface of said lower prism to the exit surface of said lower prism, the exit surface of said lower prism emitting the image reflected by the reflective surface of said lower prism to the incident surface of said upper prism, the incident surface of said upper prism receiving the image from the exit surface of said lower prism, the reflective surface of said upper prism reflecting the image received by the incident surface of said upper prism to the exit surface of said upper prism, the exit surface of said upper prism emitting the image reflected from the reflective surface of said upper prism through said window of said protective cover.

7. The circular saw as claimed in claim 1, wherein at least one of said incident surface, said reflective surface and said exit surface is flat.

8. The circular saw as claimed in claim 7, wherein said incident surface, said reflective surface and said exit surface are all flat.

* * * * *